US010949733B2

(12) United States Patent
Higuchi

(10) Patent No.: US 10,949,733 B2
(45) Date of Patent: Mar. 16, 2021

(54) SEMICONDUCTOR DEVICE AND ANTENNA LABEL

(71) Applicant: TOSHIBA MEMORY CORPORATION, Tokyo (JP)

(72) Inventor: Megumi Higuchi, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/553,800

(22) Filed: Aug. 28, 2019

(65) Prior Publication Data

US 2020/0302262 A1 Sep. 24, 2020

(30) Foreign Application Priority Data

Mar. 20, 2019 (JP) .............................. JP2019-053860

(51) Int. Cl.
*G06K 19/07* (2006.01)
*G06K 19/077* (2006.01)
*H01Q 1/36* (2006.01)
*H01Q 1/22* (2006.01)

(52) U.S. Cl.
CPC . *G06K 19/07773* (2013.01); *G06K 19/07758* (2013.01); *H01Q 1/2283* (2013.01); *H01Q 1/36* (2013.01)

(58) Field of Classification Search
CPC ....... G06K 19/07773; G06K 19/07758; H01Q 1/2283; H01Q 1/36
USPC .......................................................... 235/451
See application file for complete search history.

(56) References Cited

U.S. PATENT DOCUMENTS

| 2006/0214793 | A1  | 9/2006 | Baba |
| 2011/0128193 | A1  | 6/2011 | Arimura et al. |
| 2015/0235122 | A1* | 8/2015 | Finn ..................... H05K 1/0233 235/439 |
| 2017/0068631 | A1  | 3/2017 | Endo |

FOREIGN PATENT DOCUMENTS

| JP | 2006-018624 | 1/2006 |
| JP | 2015-001797 | 1/2015 |
| TW | 424204 B | 3/2001 |
| TW | 200504610 A | 2/2005 |

\* cited by examiner

*Primary Examiner* — Daniel A Hess
(74) *Attorney, Agent, or Firm* — Foley & Lardner LLP

(57) ABSTRACT

According to one embodiment, a semiconductor device includes a storage device in which a substrate is embedded and sealed in a mold, and an antenna label attached to the storage device. The antenna label is configured to provide a wireless communication function.

5 Claims, 3 Drawing Sheets

SEMICONDUCTOR DEVICE AND ANTENNA LABEL

CROSS-REFERENCE TO RELATED APPLICATION(S)

This application is based upon and claims the benefit of priority from Japanese Patent Application No. 2019-053860, filed Mar. 20, 2019, the entire contents of which are incorporated herein by reference.

FIELD

Embodiments described herein relate generally to a semiconductor device and an antenna label.

BACKGROUND

For example, a storage device may be attached to an electronic apparatus to store data from the electronic apparatus and to allow the electronic apparatus to read out data from the storage device.

An example of a storage device is a memory card that includes a wireless antenna and has a wireless communication function.

Examples of related art include JP-A-2011-119949.

DETAILED DESCRIPTION

Figure 1:
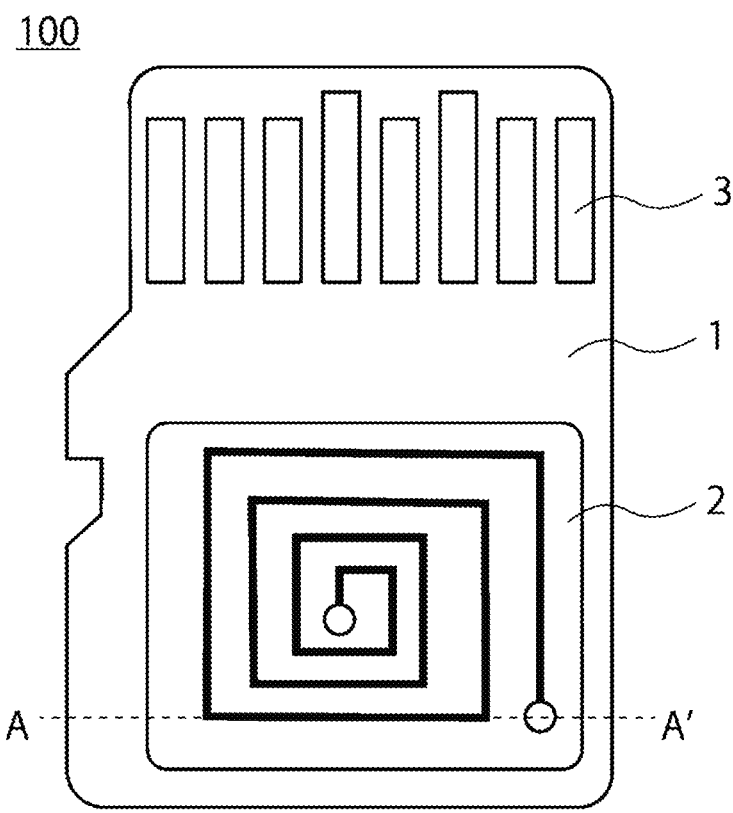
FIG. 1 is a schematic view of a semiconductor device according to an embodiment.

Embodiments contribute to wireless communication of a small semiconductor device.

In general, according to one embodiment, a semiconductor device includes a storage device in which a substrate is embedded and sealed in a mold, and an antenna label attached to the storage device. The antenna label is configured to provide a wireless communication function.

Hereinafter, embodiments will be described with reference to the accompanying drawings.

In the present specification, examples of a plurality of expressions are applied to some components. Meanwhile, the examples of these expressions are merely illustrative, and this is not to deny that the components are expressed by other expressions. Further, components to which a plurality of expressions is not applied may be expressed by other expressions.

In addition, drawings are schematically illustrated and a relationship between a thickness and planar dimensions, a ratio between thicknesses of respective layers, and the like may be different from an actual relationship, ratio, and the like. Further, in the drawings, portions may have different relationships or ratios between dimensions.

First Embodiment

A first embodiment relates to a semiconductor device. FIG. 1 shows a schematic view of a semiconductor device 100 according to the first embodiment. The semiconductor device 100 is a semiconductor package. More specifically, the semiconductor device 100 is a card device having a wireless communication function.

Figure 2:
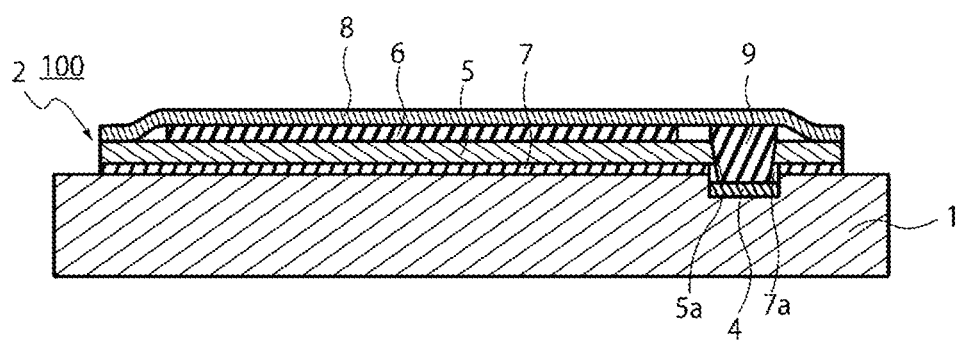
FIG. 2 is a cross-sectional view of the semiconductor device according to the embodiment.
Figure 3:
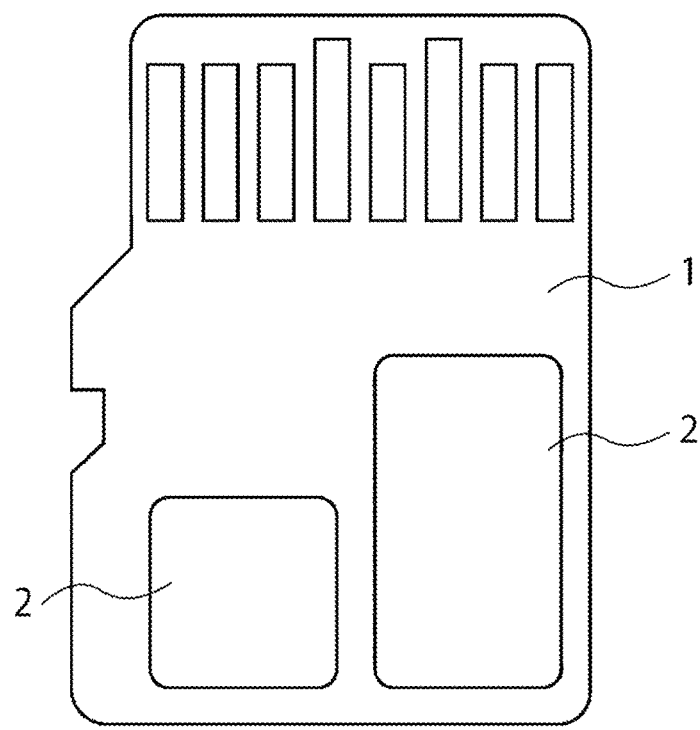
FIG. 3 is a schematic view of the semiconductor device according to the embodiment.
Figure 4:
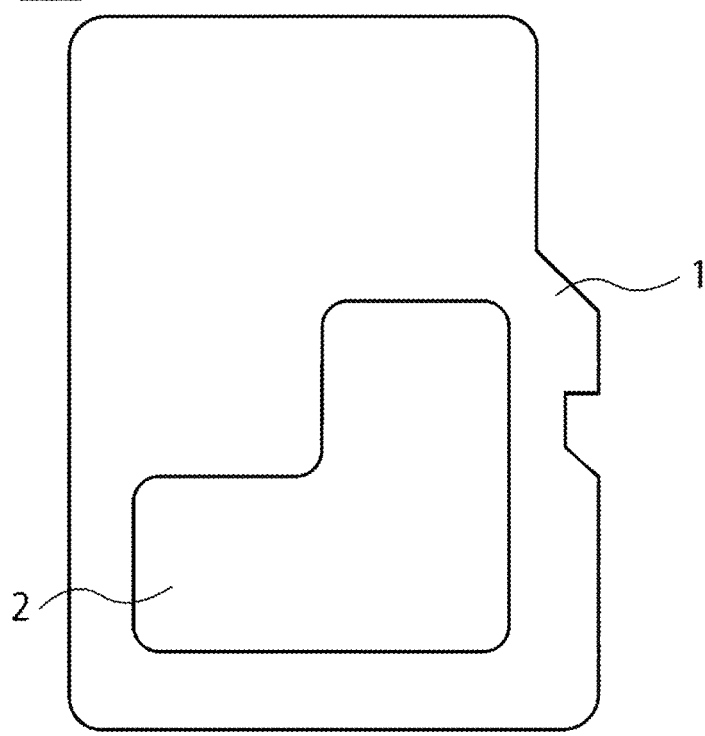
FIG. 4 is a schematic view of the semiconductor device according to the embodiment.
Figure 5:
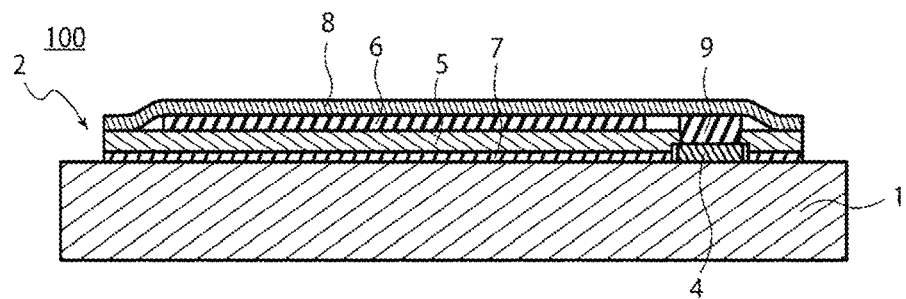
FIG. 5 is a cross-sectional view of the semiconductor device according to the embodiment.

The semiconductor device 100 of FIG. 1 includes a storage device 1 and an antenna label 2 provided attached to the storage device 1. Schematic views of FIGS. 1, 3, and 4 shows a surface of the semiconductor device 100 on which the antenna label 2 is provided. FIGS. 2 and 5 show a schematic cross-sectional view of the semiconductor device 100. The cross-sections shown in FIGS. 2 and 5 show a cross-section taken along line A-A' of FIG. 1. The antenna label 2 is attached to, for example, the outer (or upper) surface of the storage device 1.

The semiconductor device 100 is a small card device having a wireless communication function using the antenna label 2 and having a size of equal to or less than 20 mm×20 mm and a thickness of equal to or less than 1.5 mm. Since the semiconductor device 100 has a small size, restrictions on the arrangement and size of an antenna are significant, and thus it is difficult to obtain antenna characteristics. Consequently, according to the embodiment, a label-shaped antenna is attached to the outer side of a device so that high antenna characteristics are obtained even in a small device. In the embodiment, there is also an advantage in that it is possible to reduce the power required for wireless communication in the semiconductor device 100 by improving antenna characteristics.

The standard of wireless communication of the semiconductor device 100 is not particularly limited, and includes wireless LAN standardized by IEEE 802.11, infrared communication, near field wireless communication such as Bluetooth (trademark) and NFC, and mobile communication.

The storage device 1 is, for example, a micro Secure Digital (SD) card or a memory stick micro. The size of the micro SD card is 11 mm wide, 16 mm long, and 1.0 mm thick. The size of the memory stick micro is 12.5 mm wide, 15 mm long, and 1.2 mm thick. The storage device 1 is configured such that a substrate having a memory chip, a controller, and the like connected thereto is embedded and sealed in a mold resin. The controller of the storage device 1 also includes a controller of wireless communication. The outer surface of the storage device 1 is formed of a mold resin provided with a terminal.

The storage device 1 includes a plurality of external terminals 3. The external terminal 3 includes an input and output terminal and a power supply terminal. A plurality of inspection pads may be provided on the outer surface of the storage device 1.

The storage device 1 includes an antenna connection terminal 4 (FIG. 2). The antenna connection terminal 4 is provided on one outer surface of the storage device 1, and two terminals constitute one set.

The antenna label 2 includes a base material 5, an antenna 6, an adhesive layer 7, and an insulating layer 8. The antenna label 2 includes a base material having a through hole 5a, an antenna 6 provided on the base material 5, an adhesive layer 7 provided on a surface on a side opposite to a surface of the base material 5 having the antenna 6 provided thereon, and an insulating layer 8 provided on a surface of the base material 5 having the antenna 6 provided thereon and covering the antenna 6.

In addition to the plurality of inspection pads, the antenna connection terminal 4 is provided on the outer surface of the storage device 1. The antenna connection terminal 4 is provided at a position facing the antenna label 2. A bump 9 of the antenna 6 and the adhesive layer 7 are exposed to the surface of the antenna label 2 which faces the storage device 1. The bump 9 of the antenna 6 is embedded in at least a portion of the through hole 5a of the base material 5. Since the antenna label 2 is provided on the outer side of the storage device 1, it is easy to change the design of the antenna. In addition, when a plurality of antennas are used, it is possible to attach a plurality of antenna labels 2 as shown in the schematic view of the semiconductor device 100 of FIG. 3. Since the antenna is attached to the outside of the storage device 1, it is also possible to relatively freely design the shape of the antenna label 2 according to purposes. In addition, the antenna label 2 may also be provided on a surface on which the external terminal 3 is not provided, as shown in the schematic view of the semiconductor device 100 of FIG. 4.

The antenna label 2 is attached to a position where the external terminal 3 of the storage device 1 is not covered. The antenna label 2 is fixed to the storage device 1 by the adhesive layer 7. The size of the antenna label 2 is smaller than that of the storage device 1. Regarding an exemplary size of the antenna label 2, a long side may be equal to or less than 15 mm and a short side may be equal to or less than 10 mm. In a case where the antenna label 2 is provided on a surface on which the external terminal 3 of the storage device is provided, a long side may be equal to or less than 15 mm and a short side may be equal to or less than 7 mm. As the size of the antenna label 2 becomes larger, an area for the antenna becomes larger, and thus it is possible to increase the sensitivity of the antenna or dispose a plurality of antennas. However, in some embodiments, the antenna label 2 may not arbitrarily large in consideration of the possibility of a positional deviation of approximately 0.1 mm to 1.0 mm or less at the time of attaching the antenna label 2. Consequently, regarding the size of the antenna label 2, a long side may be equal to or less than 15 mm and a short side may be equal to or less than 7 mm.

The base material 5 is provided between the antenna 6 and the adhesive layer 7. The base material 5 is provided with the through hole 5a through which the bump 9 of the antenna 6, the antenna connection terminal 4, or the bump 9 of the antenna 6 and the antenna connection terminal 4 pass. From a viewpoint of the reliability of connection between the antenna 6 and the antenna connection terminal 4 and the alignment thereof, the bump 9 of the antenna 6 may be embedded in at least a portion of the through hole 5a of the base material 5. In some embodiments, a thin dielectric substrate may be used as the base material 5. The thicknesses of the micro SD card and the like are determined by a standard, and it is difficult for the semiconductor device 100 to satisfy the standard of the card device such as a micro SD when the base material 5 becomes thicker. When the base material 5 is too thin, it is difficult to form the antenna 6. Consequently, the thickness of the base material 5 may be equal to or greater than 20 μm and equal to or less than 50 μm. In some embodiments, the thickness of the base material 5 may be equal to or greater than 25 μm and equal to or less than 40 μm. A resin sheet is preferably used as the base material 5. Examples of a resin sheet suitable for the base material 5 include polycarbonate, polypropylene, polyamide, a fluorine resin, a phenol resin, an epoxy resin, an unsaturated polyester resin, and the like.

The antenna 6 includes an antenna pattern of metal wiring. The antenna pattern is connected to the antenna connection terminal 4 of the storage device 1 through the bump 9 connected to an end of the antenna pattern. The bump 9 of the antenna 6 and the antenna connection terminal 4 are in direct contact with or bonded to each other. The antenna pattern and the bump 9 may be formed of the same metal or may be formed of different metals. For example, the antenna pattern is formed of Cu or Al. A metal such as Cu or Al or a conductive adhesive such as an Ag paste may be used for the bump 9 of the antenna 6. The shape of the antenna pattern of the antenna 6 is designed in consideration of a frequency band for wireless communication, directivity, and the like. Examples of the shape of the antenna pattern include a meander line antenna and a loop antenna. When a conductive adhesive is used for the bump 9 of the antenna 6, the antenna 6 and the antenna connection terminal 4 are bonded to each other, and the reliability of a point of contact is improved.

The antenna 6 is formed by forming an antenna pattern in the base material 5, providing the through hole 5a for the bump 9 in the base material, and filling the bump 9 with a metal or a conductive adhesive. After printing and transfer are performed on the base material 5 and a metal film is formed in the base material 5, the base material 5 is subjected to pattern processing by lithography, and then the antenna pattern is formed. The through hole 5a of the base material 5 may be provided by forming the antenna pattern and then processing the antenna pattern using a laser. Alternatively, the through hole 5a may be formed in advance, and a sacrificial layer may be removed after the formation of the antenna pattern by using, for example, the base material 5 having the sacrificial layer formed in the through hole 5a, thereby forming the bump 9. The thickness of the antenna 6 (the thickness of the antenna pattern) is typically equal to or greater than 10 μm and equal to or less than 20 μm.

Bumps 9 connected to both ends of the antenna 6 are provided. More specifically, one bump 9 is connected to one end of the antenna pattern of the antenna 6, and another bump 9 is connected to the other end. The bumps 9 of the antenna 6 may project from the adhesive layer 7 as shown in the schematic view of FIG. 2 to become convex portions of the antenna label 2 and may be recessed from the adhesive layer 7 of the antenna label 2 as shown in the schematic view of the semiconductor device 100 of FIG. 5 to become concave portions of the antenna label 2. In some embodiments, the bumps 9 of the antenna 6 and the antenna connection terminal 4 of the storage device 1 may be fitted and bonded to each other. The accuracy of bonding is increased by the fitting therebetween and the reliability of bonding is increased by bonding at a fitting portion. In a case where the bumps 9 of the antenna 6 are convex portions of the antenna label 2, the antenna connection terminal 4 of the storage device 1 becomes a concave portion relative to the outer surface of the storage device as shown in FIG. 2. In a case where the bumps 9 of the antenna 6 are concave portions of the antenna label 2, the antenna connection terminal 4 of the storage device 1 becomes a convex portion relative to the outer surface of the storage device as shown in FIG. 5.

The adhesive layer 7 is provided on a surface facing a surface on which the antenna pattern of the base material 5 is formed. The antenna label 2 and the storage device 1 are bonded to each other using the adhesive layer 7. While the adhesive in the adhesive layer 7 is not particularly limited, a resin-based adhesive is practically used. Examples of the adhesive for the adhesive layer 7 include an acrylic resin, a vinyl acetate resin, an epoxy resin, a silicon-based material, and a polyimide-based material. The adhesive layer 7 is also provided a through hole 7a through which the antenna connection terminal 4 or the bump 9 of the antenna 6 and the antenna connection terminal 4 pass. The thickness of the adhesive layer 7 is typically equal to or greater than 10 μm and equal to or less than 20 μm.

The insulating layer 8, which is a protection film such as a coating film or a laminated film, covers the base material 5 in which the antenna 6 is formed. The insulating layer 8 may be an insulating thin film with an excellent strength in order to protect the antenna 6. In the insulating layer 8, a single layer or a stacked film such as a polytetrafluoroethylene film, a polyester film, a polyphenylene sulfide film, or a polyimide film is used as the laminated film. In the insulating layer 8, a thermosetting resin and a UV curing resin may also be used as the coating film. An acrylate resin such as a urethane-based resin or an acrylic-based resin may be used as the UV curing resin. Characters, figures, and the like may be printed on the insulating layer 8. It is preferable to include any one of the above-described adhesive layers on the surface of the insulating layer 8 on the base material 5 side. The thickness of the insulating layer 8 is typically equal to or greater than 10 μm and equal to or less than 30 μm.

Second Embodiment

Figure 6:
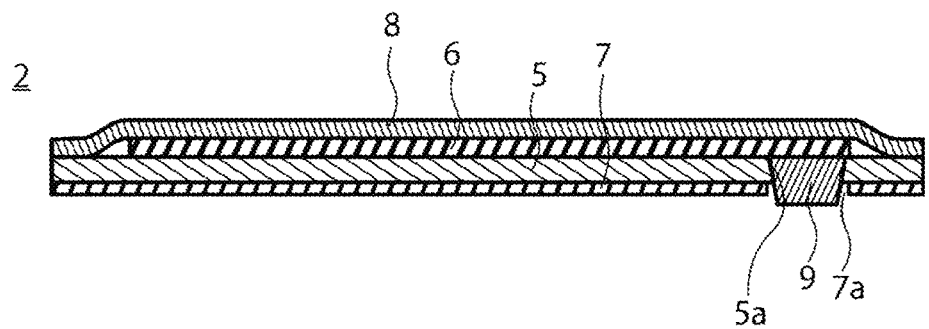
FIG. 6 is a cross-sectional view of the semiconductor device according to the embodiment.
Figure 7:
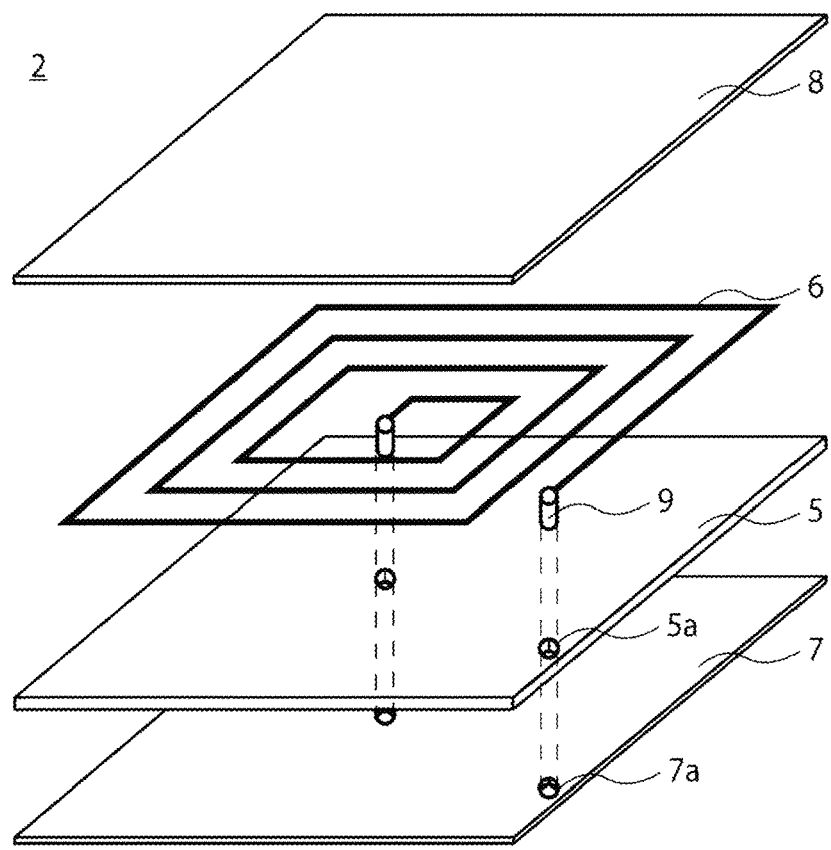
FIG. 7 is a development view of the semiconductor device according to the embodiment.

A second embodiment relates to an antenna label to be attached to a small device. FIG. 6 shows a schematic cross-sectional view of an antenna label 2. FIG. 7 shows a schematic development view of the antenna label 2. The antenna label 2 includes a base material 5 having a through hole 5a, an antenna 6 provided on the base material 5, an adhesive layer 7 provided on a surface on a side opposite to a surface of the base material 5 having the antenna 6 provided thereon, and an insulating layer 8 provided on a surface of the base material 5 having the antenna 6 provided thereon and covering the antenna 6.

In the cross-sectional view shown in FIG. 6, a bump 9 of the antenna 6 protrudes. Alternatively, the bump 9 of the antenna 6 may be recessed. As shown in the development view of the antenna label 2 of FIG. 7, the base material 5 and the adhesive layer 7 are provided with the through holes 5a and 7a, respectively, and the bump 9 of the antenna 6 passes through the through holes 5a and 7a. It is possible to increase the reliability of connection to a device having the antenna label 2 attached thereto by using a conductive adhesive for the bump 9. In addition, the conductive adhesive may be more manageable in terms of processing than a metal. Thus, from a viewpoint of manufacturing the antenna label 2, the conductive adhesive may be used. The size and constituent material of the antenna label 2 are the same as those described above.

Other Embodiments (a) A method of manufacturing a semiconductor device 1 and an antenna label 2 according to another embodiment will be described. Cu foils are attached to a base material 5 formed of polyimide or the like through an adhesive or the like. In this case, it is also possible to attach the Cu foils without an adhesive. A surface of the base material 5 on which an antenna 6 is formed will be referred to as a front surface, and a surface on an opposite side will be referred to as a rear surface. The antenna 6 is formed by patterning the attached Cu foils through photolithography or the like. A through hole 5a penetrating the base material 5 is formed from the rear side of the surface of the base material 5 on which the antenna 6 is formed by using a laser beam, photolithography or the like. A portion of the antenna 6 is seen at the bottom of the through hole 5a.

A base film is formed of Cu/Ti or the like on the rear surface of the base material 5 through sputtering. Thereafter, a bump 9 is formed through photolithography and plating. Cu/Ti or the like of the base film in portions other than a necessary portion is removed. In this case, the bump 9 is formed to protrude from the surface of the base material 5. A material of the bump 9 includes a metal material such as Cu, Au, or Ni which is capable of being formed by existing plating. An insulating layer 8 is formed on a front surface of the base material 5. In this manner, the antenna label 2 is formed. An adhesive layer 7 is not yet formed in the antenna label 2.

The adhesive layer 7 is formed by being applied or attached to the rear surface of the base material 5. The adhesive layer 7 may be a film or a liquid adhesive. In this case, a tip end of the bump 9 may be or may not be covered with the adhesive layer 7. The antenna label 2 is aligned and pressed so that the bump 9 and an antenna terminal 4 are connected to each other. The adhesive layer 7 remaining between the bump 9 and the antenna terminal 4 is pressed to flow, so that the adhesive layer escapes between the bump 9 and the antenna terminal 4. Thereby, the bump 9 is electrically connected to the antenna connection terminal 4.

(b) The antenna label 2 may be formed in order from the insulating layer 8. First, Cu foils are attached to the insulating layer 8 formed of polyimide or the like through an adhesive or the like. In this case, the Cu foils may also be attached without an adhesive. A surface of the insulating layer 8 on the antenna 6 is formed will be referred to as a front surface. The antenna 6 is formed by patterning the attached Cu foils through photolithography or the like. An insulating interlayer formed of polyimide or the like is formed on the front surface of the insulating layer 8 to constitute the base material 5, and a through hole 5a is formed therein. A portion of the antenna 6 is seen at the bottom of the through hole 5a. The through hole 5a can be easily formed in the base material 5 through photolithography or the like as long as the insulating interlayer is, for example, photosensitive polyimide or the like. When the insulating interlayer is not a photosensitive material, the through hole 5a may be formed through laser beam machining or the like.

Thereafter, the bump 9 is formed through a plating method. A process after the bump 9 is formed is the same as in the embodiment (a). The bump 9 is electrically connected to the antenna connection terminal 4 also by such a method.

In the embodiments (a) and (b), an anisotropic conductive film (ACF) may be used for the adhesive layer 7. Alternatively, an anisotropic conductive material such as an anisotropic conductive paste (ACP) may be used. In this manner, it is possible to obtain stable electrical connection. In this case, a resin component remains between the bump 9 and the antenna connection terminal 4. For this reason, the through hole 7a may also be formed as in the first and second embodiments.

In the embodiments (a) and (b), Cu foils are used as the antenna 6. However, the present disclosure is not limited thereto, and a metal thin film formed through sputtering may be used as the antenna 6, or the antenna 6 may be formed through printing using a conductive paste or the like. As a metal material of the antenna 6, various metals such as Al, Cu, Ag, and Au may be used. In the specification, at least some elements are represented by only element symbols.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device comprising:
    a storage device in which a substrate is embedded and sealed in a mold;
    an adhesive layer with a first through hole provided on a surface of the mold,
    a base material with a second through hole, the base material including a first surface in touch with the adhesive layer and a second surface opposite to the first surface;
    an antenna provided on the second surface of the base material, the antenna including a bump; and
    an insulating layer provided over the second surface of the base material and the antenna,
    wherein the bump of the antenna is embedded in at least one of the first through hole or the second through hole, and
    wherein the antenna is configured to provide a wireless communication function.

2. The semiconductor device according to claim 1, wherein
    the storage device is a micro Secure Digital (SD) card or a memory stick micro.

3. The semiconductor device according to claim 1, wherein
    the antenna is formed as an antenna pattern, wherein the bump is connected to the antenna pattern, and
    one or more antenna connection terminals that correspond to the bump are connected to each other.

4. The semiconductor device according to claim 1, wherein the mold has a hole reaching to the substrate, and the bump of the antenna is embedded in at least a portion of the hole.

5. The semiconductor device according to claim 1, further comprising a electrode provided outside the mold, wherein the bump of the antenna is connected to the electrode.

* * * * *